(No Model.)
J. A. BIDWELL.
ATTACHMENT FOR AMALGAMATING PANS.
No. 336,692. Patented Feb. 23, 1886.
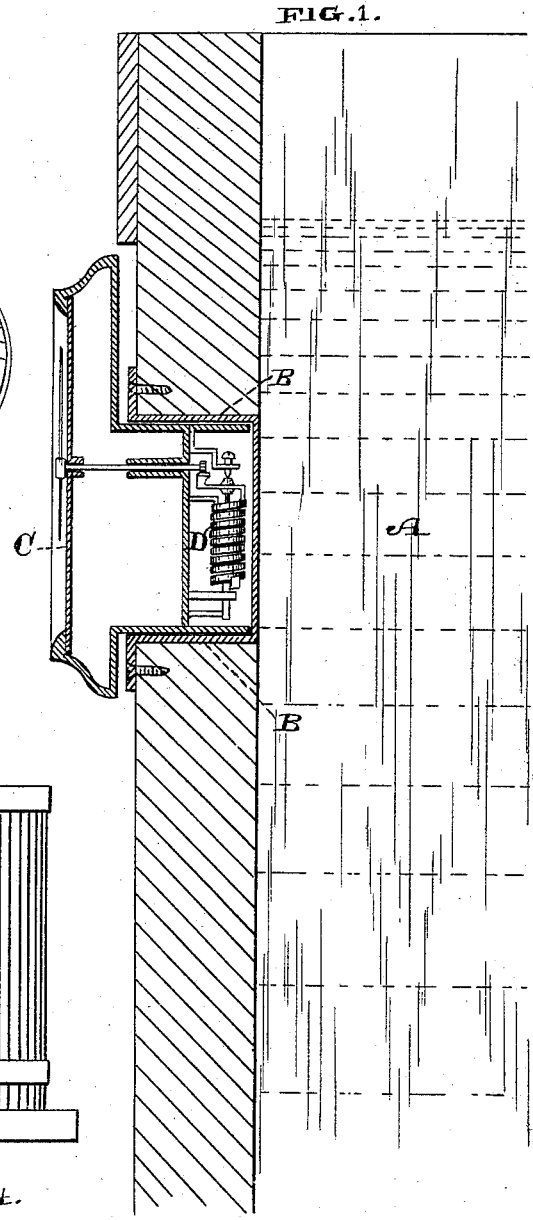
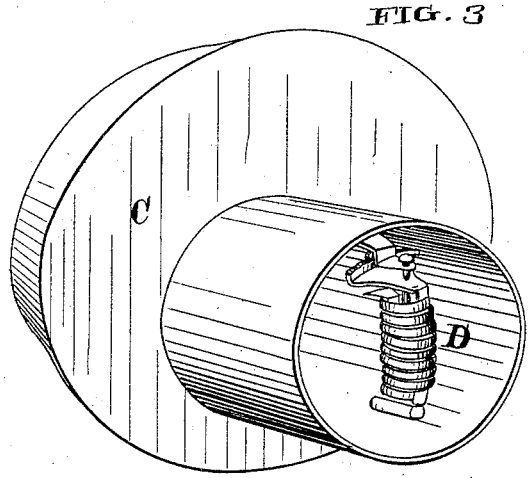
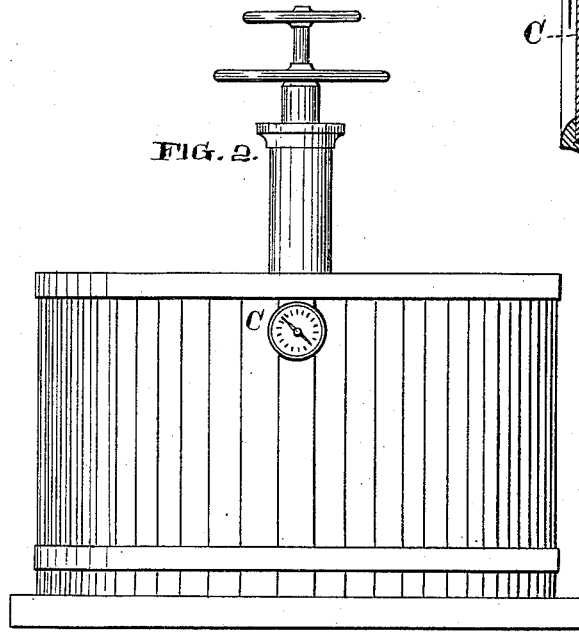
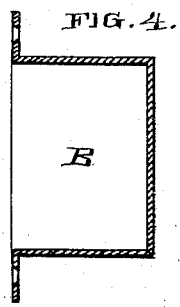
Witnesses,
Inventor,
J. A. Bidwell
By Dewey &
Attorney

UNITED STATES PATENT OFFICE.

JULIUS A. BIDWELL, OF IVANPAH, CALIFORNIA.

ATTACHMENT FOR AMALGAMATING-PANS.

SPECIFICATION forming part of Letters Patent No. 336,692, dated February 23, 1886.

Application filed July 10, 1885. Serial No. 171,254. (No model.)

*To all whom it may concern:*

Be it known that I, JULIUS A. BIDWELL, of Ivanpah, San Bernardino county, State of California, have invented an Improvement in Attachments for Amalgamating-Pans; and I hereby declare the following to be a full, clear, and exact description of the same.

My invention relates to an attachment by which the temperature of the material within an amalgamating-pan may be accurately known at any time; and it consists of a thermometer of that class in which the lengthening and shortening of a steel spiral operates the index-hand or pointer which moves over a dial, an extension within which the spiral is contained, and a chamber formed in the side of the pan, into which this portion of the thermometer projects, so that without being introduced into the pulp it is surrounded by it, so that the temperature is accurately indicated at all times.

Referring to the accompanying drawings for a more complete explanation of my invention, Figure 1 is a vertical section of one side of a pan, showing my invention. Fig. 2 shows the position of the dial on the pan. Fig. 3 shows the back of the dial with the extension and mechanism. Fig. 4 is a section of the flanged chamber.

In the amalgamation of ores the pulp or material to be treated is usually heated to a considerable temperature, which has a favorable effect upon the quicksilver and chemicals used in amalgamation. It is well known, however, that different ores require a different heat to produce the best results, and to accurately regulate this temperature it is necessary to plunge a thermometer into the mass from time to time. This is an exceedingly inconvenient operation, and is very apt to break the thermometer, besides which it is frequently neglected by the operator.

In my device A represents the pan, having an opening made in one side, into which a flanged chamber, B, is fitted. This chamber may be oval or any other suitable or desirable form, so as to receive the parts of the thermometer which are to be inserted into it, the other side of the chamber being open, as shown.

C is a dial-thermometer having the coiled metal bar D, by the lengthening or shortening of which the index-hand is caused to move over the dial and indicate the temperature. This coiled bar is usually secured within the case of the thermometer.

In my invention I make an extension, D, which projects from the back of the case, and is of the same form as the chamber B on the pan, so that it fits within said chamber, as shown. The thermometer is suitably fixed to the side of the pan, so that this portion which is actuated by the heat lies within the chamber B, and is entirely surrounded by the heated pulp within the pan. The conducting power of the metal chamber and casing will be sufficient so that the thermometer will be acted upon, and will indicate at all times upon the dial the temperature of the contents of the pan.

Having thus described my invention, what I claim as new, and desire to secure by Letters Patent, is—

An amalgamating-pan having a chamber, B, projecting inwardly from one side, with its outer side opening through the side of the pan, in combination with a thermometer having a projecting casing fitting within said chamber and so constructed as to contain the expanding and contracting coil by which the index-hand is operated, substantially as herein described.

In witness whereof I have hereunto set my hand.

JULIUS A. BIDWELL.

Witnesses:
S. H. NOURSE,
H. C. LEE.